United States Patent [19]
Bon-Mardion et al.

[11] 4,441,325
[45] Apr. 10, 1984

[54] REFRIGERATING OR HEAT PUMPING PROCESS AND APPARATUS

[75] Inventors: Gilbert Bon-Mardion, Eybens; Gérard Claudet, Grenoble; Albert Lacaze, Meylan, all of France

[73] Assignee: Commissariat a l'Energie Atomique, Paris, France

[21] Appl. No.: 444,193

[22] Filed: Nov. 24, 1982

[30] Foreign Application Priority Data

Nov. 27, 1981 [FR] France .................. 81 22276

[51] Int. Cl.³ .......................................... F25B 21/02
[52] U.S. Cl. ............................................... 62/3
[58] Field of Search .................................... 62/3

[56] References Cited

U.S. PATENT DOCUMENTS

| | | | |
|---|---|---|---|
| 3,108,444 | 10/1963 | Kahn | 62/3 |
| 3,125,861 | 3/1964 | Jaep | 62/3 |
| 3,413,814 | 12/1968 | Van Geuns | 62/3 |
| 4,033,734 | 7/1977 | Steyert, Jr. et al. | 62/3 |
| 4,107,935 | 8/1978 | Steyert, Jr. | 62/3 |

FOREIGN PATENT DOCUMENTS

| | | |
|---|---|---|
| 997056 | 12/1951 | France . |
| 1516393 | 1/1968 | France . |
| 2383410 | 6/1978 | France . |

OTHER PUBLICATIONS

Journal, "International Cryogenic Engineering Conferences", vol. 8, Nov. 4, 1980, pp. 215–217.
Journal, "Proceedings of the Physical Society", vol. 92, Dec. 1967, pp. 400–407.
Journal, "Cryogenics", vol. 20, No. 8, Aug. 1980, pp. 467–471.

Primary Examiner—Lloyd L. King
Attorney, Agent, or Firm—James E. Nilles

[57] ABSTRACT

The invention relates to a refrigerating or heat pumping process, as well as to an apparatus for performing this process.

The apparatus comprises a toroidal cryostat, provided with first and second pipes for supplying fluid at temperature $T_1$ from a heat source and a pipe for discharging this fluid, a paramagnetic substance support rotating in the cryostat, means for inducing a magnetic field in the cryostat, a fourth pipe for supplying fluid and a fifth pipe for discharging fluid at temperature $T_2$ relative to a cold source. The magnetic field applied makes it possible, during the rotation of the support, to lower the temperature of the cold source and increase the temperature of the hot source.

Application to refrigeration and heat pumping.

14 Claims, 9 Drawing Figures

REFRIGERATING OR HEAT PUMPING PROCESS AND APPARATUS

BACKGROUND OF THE INVENTION

The present invention relates to a refrigerating or heat pumping process, as well as to an apparatus for performing this process. The process and apparatus use a paramagnetic substance and a fluid in contact therewith. It is applicable to refrigeration, particularly to very low temperatures, as well as to heat pumping.

It is known that refrigeration and heat pumping require similar installations. In heat pumping, the part of the installation is used, which gives off heat at high temperature to the ambient medium or to another body. In refrigeration, that part of the installation is used, which, at low temperature absorbs the heat of the ambient medium or of another body.

It is also known that refrigeration and heat pumping can be realized on the basis of a thermodynamic cycle, in which a certain quantity of heat is taken from a cold source, whilst another quantity of heat is restored to a hot source. The standard thermodynamic cycle in refrigeration or heat pumping is the Carnot cycle. This cycle generally comprises, in the case of a motor, the isothermal expansion of a gas, followed by an adiobatic expansion and then an isothermal compression and finally an adiobatic compression. During this cycle, the energy exchanges with the outside are in order: heat supply $Q_1$, work production $W_1$, heat removal $Q_2$, work supply $W_2$. The useful work $W$ is given by the relation:

$$W = W_1 - W_2 = Q_1 - Q_2$$

which represents the area of the Carnot cycle. The efficiency can then be expressed by the relation:

$$r = \frac{W}{Q_1} = \frac{Q_1 - Q_2}{Q_1} = 1 - \frac{Q_2}{Q_1} = 1 - \frac{T_2}{T_1}$$

In this relation, $T_2$ is the temperature of the cold source, whilst $T_1$ is the temperature of the hot source.

It is not possible to realize the Carnot cycle in refrigeration or heat pumping installations, due to heat exchange problems.

BRIEF SUMMARY OF THE INVENTION

The problem of the present invention is to obviate this disadvantage and in particular to provide a refrigerator or heat pump, which makes it possible to realize a refrigeration or heat pumping process in which the successive operations using a thermodynamic cycle makes it possible to obtain a much higher efficiency than that obtained with an ordinary gas cycle.

The problem of the invention is solved by a refrigerating or heat pumping process using a paramagnetic substance and a fluid in contact therewith, wherein it comprises performing:

a magnetization of the substance by a magnetic field, said magnetization being performed thermally at a fluid temperature close to a first temperature $T_1$ of a heat source;

a cooling of the substance by heat exchange with the fluid between the first temperature $T_1$ and a second temperature of said fluid close to a second temperature $T_2$, of a cold source;

a demagnetization of the substance by a magnetic field, said demagnetization being performed isothermally, at a temperature close to the second temperature $T_2$;

a heating of the substance by heat exchange with the fluid between the second temperature $T_2$ and the first temperature $T_1$;

the isothermal magnetization of the substance being performed by removing the magnetization heat by means of the fluid, by relative displacements of the fluid and the substance, the fluid firstly displacing in the displacement direction of the substance and then in the direction opposite thereto, in such a way that the temperatures at the start and finish of magnetization are the same.

According to another feature of the invention, the fluid is gaseous.

According to another feature of the invention, the gaseous fluid used is helium.

According to another feature, the paramagnetic substance used is a monocrystal of gadolinium garnet and gallium.

The invention also relates to a refrigerator, wherein it comprises:

a toroidal cryostat, provided with at least first and second supply pipes and a third discharge pipe for the fluid, said third discharge pipe being positioned between the supply pipes, which are connected to a hot source at temperature $T_1$;

a paramagnetic substance support having a toroidal shape and driven by means which rotate it within the cryostat in a predetermined direction;

means for inducing a non-uniform magnetic field in the cryostat, in such a way that this magnetic field is low in the vicinity of the first fluid supply pipe, whose temperature is close to the temperature $T_1$ of the hot source, the fluid supplied by said first pipe being at pressure $P_1$ and circulating in the cryostat in the predetermined direction and in an opposite direction, on either side of the entry point of the first pipe into the cryostat, the magnetic field being at a maximum in the vicinity of the first fluid supply pipe, whose temperature is close to the temperature $T_1$ of the hot source, the fluid supplied by said second pipe being at pressure $P_1 - \Delta P_1$ below $P_1$, the fluid whose temperature is close to the temperature $T_1$ of the hot source being discharged by the third discharge pipe;

fourth and fifth supply and discharge pipes for the said fluid located in the lower part, the temperature of the fluid supplied by this fourth pipe being close to the temperature $T_2$ of a cold source, below the temperature $T_1$ of the hot source, the field produced by the means for inducing a magnetic field being a demagnetization field of the substance between said fourth and fifth pipes.

According to another feature of the invention, the means for inducing a magnetic field in the cryostat are constituted by superconducting coils arranged so as to produce a radial field in the cryostat.

According to another feature, the means for inducing a magnetic field in the cryostat are constituted by superconducting coils arranged in such a way as to produce a transverse field in the cryostat.

According to another feature, the means for producing a magnetic field in the cryostat are constituted by permanent magnets disposed in such a way as to produce a radial field in the cryostat.

According to another feature, the means for inducing a magnetic field in the cryostat are constituted by permanent magnets disposed in such a way as to produce a transverse field in the cryostat.

According to another feature the fluid is gaseous.

According to another feature the gaseous fluid is helium.

According to another feature the paramagnetic substance is a monocrystal of gadolinium garnet and gallium.

According to another feature, the means for rotating the support are mechanical means.

According to another feature the means for rotating the support are magnetic means.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
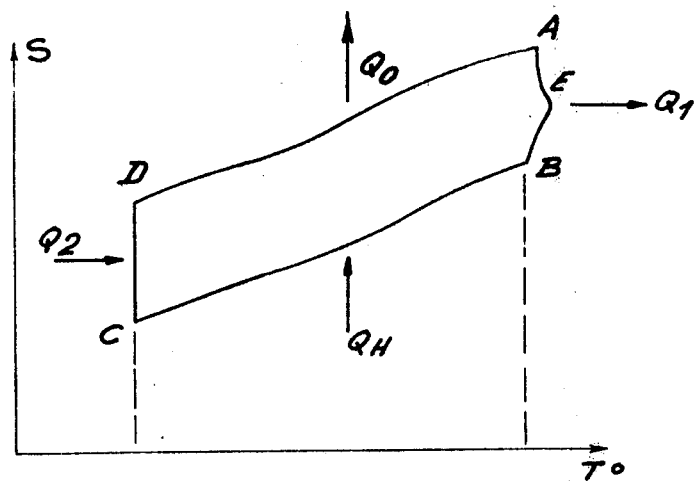
FIG. 1 the thermodynamic cycle realized in the process and apparatus according to the invention, in an entropy (S)—temperature (T) diagram using a gaseous fluid.

FIG. 1 shows in an entropy (S)—temperature (T) diagram, the thermodynamic cycle used in the process and apparatus according to the invention, which use a paramagnetic substance, such as a monocrystal of gadolinium garnet and gallium, as well as a gaseous fluid such as e.g. helium.

The paramagnetic substance placed on a toroidal support, rotates in a toroidal cryostat in such a way that each portion of the substance performs a cycle, which firstly consists of a magnetization of the substance at a substantially constant temperature close to a temperature $T_1$ of a hot source formed by a gaseous fluid at the said temperature. This isothermal magnetization is represented by part AB of the cycle. During this magnetization, a heat quantity $Q_1$ is transferred to the hot source at temperature $T_1$, a rising magnetic field being applied to the substance as from a very low value at point a to a maximum value at point b. The substance is then cooled between points b and c by contact with the gaseous fluid circulating in a direction opposite to the displacement direction of the substance. During its cooling, the substance gives off a heat quantity $Q_H$ to the gaseous fluid. Its temperature varies between temperature $T_1$ of the hot source and temperature $T_2$ of a cold source formed by the gaseous fluid at this temperature. This cooling of the substance takes place in an area of a constant magnetic field or a magnetic field whose variation is calculated in such a way that the substance has the best possible heat exchange with the gaseous fluid. The substance is then demagnetized between points c and d at a constant temperature close to the temperature $T_2$ of the cold source. During this demagnetization at constant temperature, the substance absorbs a heat quantity $Q_2$ from the cold source at temperature $T_2$. Finally, between points d and a, the substance is heated from the temperature $T_2$ of the cold source to the temperature $T_1$ of the hot source by contact with the gaseous fluid circulating in the direction opposite to the displacement of the substance. During this heating, which is performed at a substantially zero magnetic field, the substance absorbs a heat quantity $Q_O$, which is made equal to the heat quantity $Q_H$ given off by the substance during its cooling between points b and c. This equality is obtained as a result of a zero magnetic field or a magnetic field having a predetermined variation for the cycle path BC.

The process and apparatus using this cycle make it possible to obtain an efficiency 70% higher than that of the aforementioned Carnot cycle.

Figure 2:
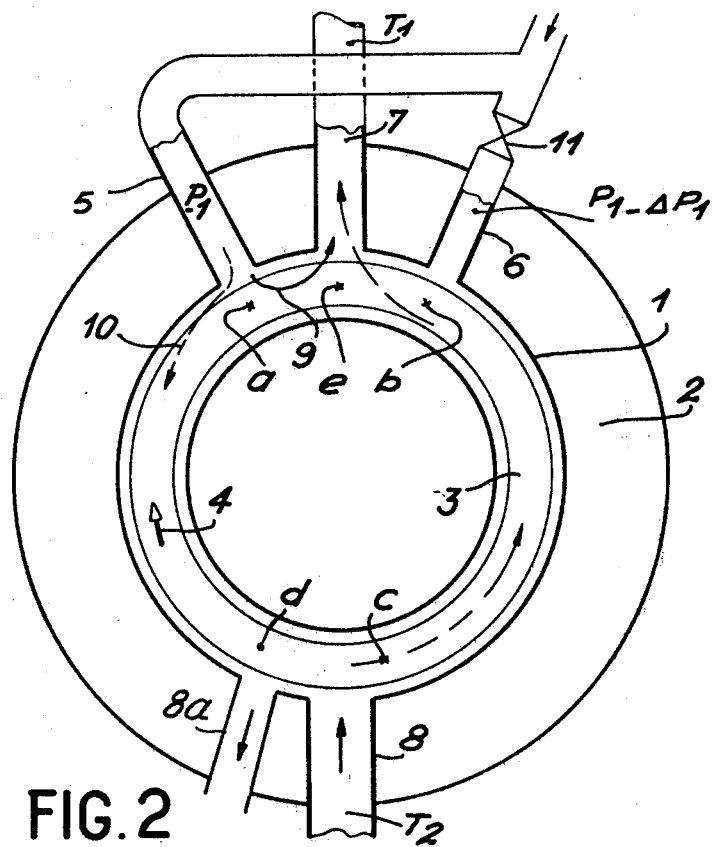
FIG. 2 a diagrammatic side view of the apparatus according to the invention.

FIG. 2 very diagrammatically shows a side view of the apparatus according to the invention.

In FIG. 2, points a, b, c, d, and e make it possible to establish a correspondance, as will be shown in greater detail hereinafter, with points A, B, C, D and E of the cycle of FIG. 1. The apparatus shown in FIG. 2 comprises a toroidal cryostat 1 enclosed in a vacuum enclosure 2. It also comprises a not shown toroidal paramagnetic substance support 3. This support is rotated within cryostat 1 by not shown means and which will be described hereinafter. The rotation direction of this support is indicated by arrow 4. Cryostat 1 is provided with first and second gaseous fluid supply pipes 5, 6, the gaseous fluid being e.g. helium, and a third gaseous fluid discharge pipe 7. The discharge pipe is positioned e.g. between supply pipes 5 and 6. Pipes 5, 6 and 7 are connected to a hot source (e.g. helium) at temperature $T_1$ and form a closed circuit therewith.

The apparatus also comprises a fourth gaseous fluid supply pipe 8 and a fifth discharge pipe 8a, said pipes being located in the lower part and are connected to a cold source at temperature $T_2$, such as a not shown low temperature helium source, $T_2$ being below $T_1$. Finally, the apparatus comprises not shown means and which will be described hereinafter, making it possible to induce a nonuniform magnetic field in the cryostat. This magnetic field is weak in the vicinity of the first gaseous fluid supply pipe 5, whose temperature is close to the temperature $T_1$ of the hot source. The gaseous fluid supplied by the first pipe 5 is at a pressure $P_1$. It circulates in the cryostat, on either side of supply pipe 5, either in the predetermined rotation direction of the support as indicated by arrow 9, or in the direction opposite thereto and as indicated by arrow 10. The means making it possible to induce a magnetic field are arranged in such a way that this field is weak in the vicinity of the first pipe 5 and strong in the vicinity of the second pipe 6. The pressure $P_1 - \Delta P_1$ of the gaseous fluid supplied by the second pipe 6 is lower than the pressure $P_1$ of the gaseous fluid supplied by the first pipe 5. This pressure is fixed by a valve 11 and the gaseous fluid is discharged at a pressure $P_O$ by the third pipe 7 to the hot source of temperature $T_1$. The pressure difference $\Delta P_1$ makes it possible to circulate the helium in a regulatable quantity about the paramagnetic substance in a direction opposite to the direction of support 3. Thus, it is possible to cool the substance from $T_1$ to $T_2$ between B and C and to heat it from D to A without any loss of heat (cycle of FIG. 1).

The means making it possible to induce a magnetic field, induce a magnetic field demagnetizing the substance between pipes 8 and 8a, which make it possible to supply and discharge a gaseous fluid at temperature $T_2$ from the cold source. These means also make it possible to produce a constant field (or a field whose variation is calculated) between the second pipe 6 and the fourth pipe 8, whilst the magnetic field is zero between the fifth pipe 8b and the first pipe 5. The paramagnetic substance portion carried by toroidal support 3, which is rotated within cryostat 1, describes the cycle of FIG. 1. Thus, on considering at the outset a paramagnetic substance portion facing point a, this substance is magnetized as a result of magnetic induction means between points a and b at a substantially constant temperature $T_1$ and it gives off a heat quantity $Q_1$ to the hot source. The temperature is slightly below $T_1$ facing the first and second gaseous fluid supply pipes 5 and 6, whilst it is very close to $T_1$ facing discharge pipe 7. This slight variation is shown by point E of the cycle in FIG. 1. This point E in fact corresponds to the temperature opposite discharge pipe 7. The paramagnetic substance is then cooled between points b and c by contact with the gaseous fluid from the cold source at temperature $T_2$, said gaseous fluid circulating in the opposite direction to the rotation direction 4 of the support. Between points b and c, the substance gives off a heat quantity $Q_H$ to the helium As indicated hereinbefore, this transformation takes place in an area with a constant magnetic field or a field whose variation is calculated to have the best possible heat exchange with the helium. The substance is then demagnetized between points c and d, facing the cold source, at a constant temperature $T_2$. During this demagnetization, it absorbs a heat quantity $Q_2$ coming from the cold source at temperature $T_2$. The temperature of the substance then rises between points d and a to $T_1$ by contact with the gaseous fluid circulating in the opposite direction (arrow 10), in a zero magnetic field zone (or with a calculated variation). It then absorbs a heat quantity $Q_O$ from the gaseous fluid, said quantity being equal to the heat quantity $Q_H$ transferred to the helium during cooling. This equality is obtained, through the absence of the magnetic field or due to a magnetic field having a calculated variation between points d and a. It is obviously assumed that in the apparatus described hereinbefore, the pressure $P_O$ in the third pipe 7 is below the pressures $P_1$ and $P_1 - \Delta P_1$ of the gaseous fluid in the first and second pipes 5, 6 to permit the discharge of said fluid to the hot source at temperature $T_1$.

Figure 3:
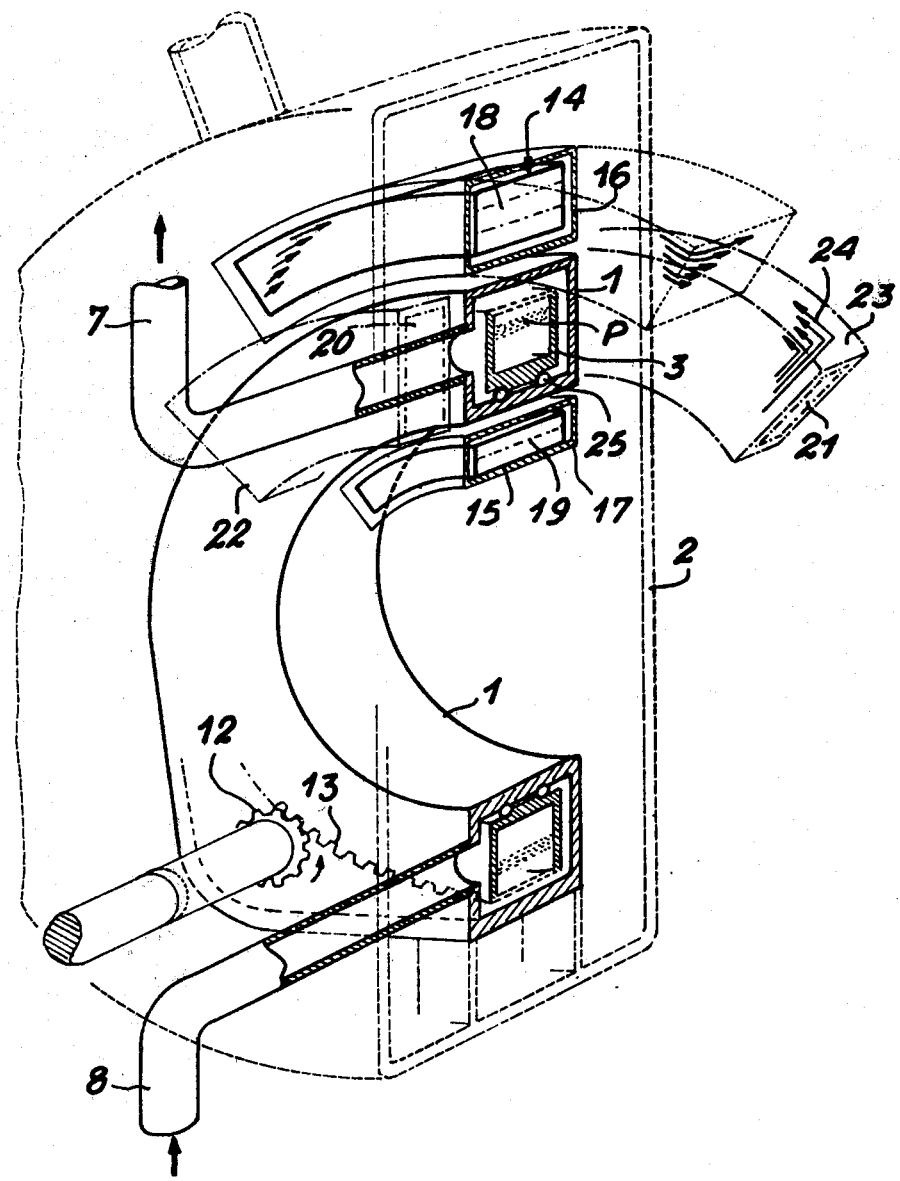
FIG. 3 in greater detail the apparatus according to the invention, for two embodiments of the means making it possible to apply a variable magnetic field to the cryostat.

Two embodiments of the apparatus according to the invention are shown in more detailed form in FIG. 3. The same elements carry the same references as in FIG. 2. It is possible to see the cryostat in which the support 3 for the paramagnetic substance P rotates.

According to one embodiment, the means for driving this support are of a mechanical type and are constituted e.g. by a pinion 12 driving a motor (not shown) and engaging on a toothed ring 13 formed on the periphery of support 3. Cryostat 1 is located in the vacuum enclosure 2. It is possible to see the third gaseous fluid discharge pipe 7 and the fourth pipe 8 for supplying the gaseous fluid at temperature $T_2$ from the cold source. The other pipes are not shown, so as not to overcomplicate the drawing.

According to a special embodiment, the means making it possible to induce a magnetic field in the cryostat are constituted by superconducting coils 14, 15 located on either side of the cryostat 1, so as to induce a radial field therein. These coils are obviously contained in cryostat 16, 17. They are constituted by superconductor windings 18, 19 wound on to cores shaped like portions of tori. In this embodiment of the means making it possible to induce a magnetic field in the cryostat, said means are only shown opposite the first, second and third pipes 5, 6, 7. However, it is obvious that coils of the same type and which are wound as a function of the desired field, are positioned in the same way around the cryostat, so as to produce the aforementioned magnetic fields.

According to another embodiment, the means making it possible to induce magnetic fields in the cryostat are once again constituted by superconducting coils 20, 21 disposed in cryostats 22, 23 and positioned on either side of cryostat 1, parallel to its lateral faces, so as to induce a transverse magnetic field therein. As in the previous case, these coils are formed by superconductor windings 24, wound on to a core shaped like a portion of a torus. As in the previous embodiment, these coils are only shown facing the first, second and third pipes 5, 6, 7 (FIG. 2), but it is obvious that other not shown coils are arranged around the cryostat, as a function of the magnetic fields to be obtained.

The rotation of support 3 in cryostat 1 can be facilitated by balls 25 arranged between support 3 and the cryostat.

Figure 4:
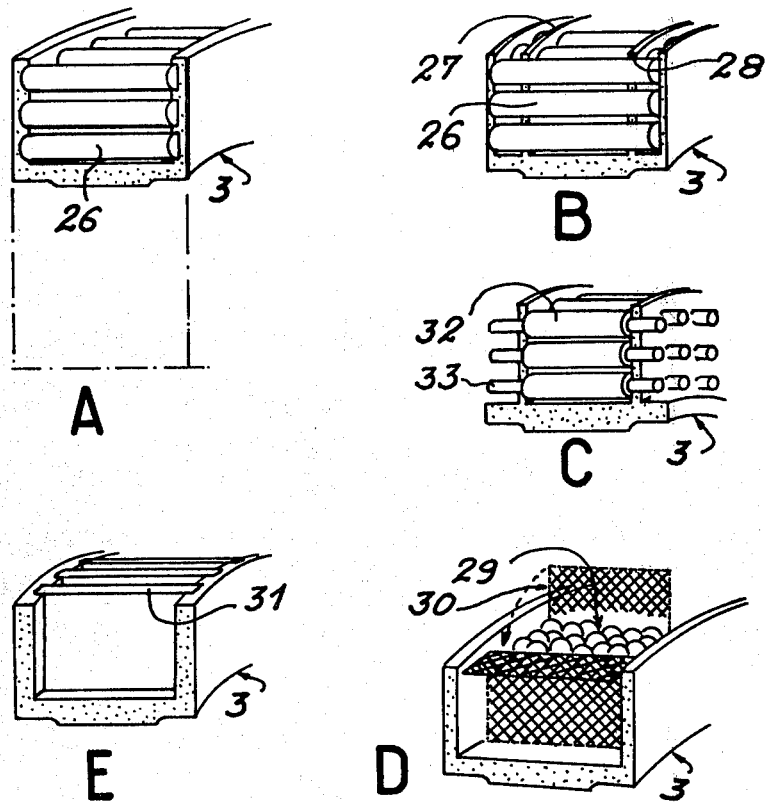
FIG. 4 at (A), (B), (C), (D) and (E) various embodiments of the paramagnetic substance support.

FIG. 4 shows various embodiments of the paramagnetic substance support 3.

In the embodiment shown at (A), the paramagnetic substance is in the form of bars 26 held by the lateral faces of support 3.

In the embodiment shown at (B), the paramagnetic substance bars 26 are secured by spacers 27, 28 in the form of perforated washers and positioned between the lateral faces of support 3.

In the embodiment shown at (C), the paramagnetic substance forms bars 32, whereof each smaller diameter end 33 engages in perforations of the lateral faces of support 3.

In the embodiment shown at (D), the paramagnetic substance is in the form of balls 29 held between the lateral faces of support 3 by a grating 30.

Finally in the embodiment shown at (E), the paramagnetic substance is in the form of small plates 31, which engage in grooves made in the lateral faces of support 3.

Figure 5:
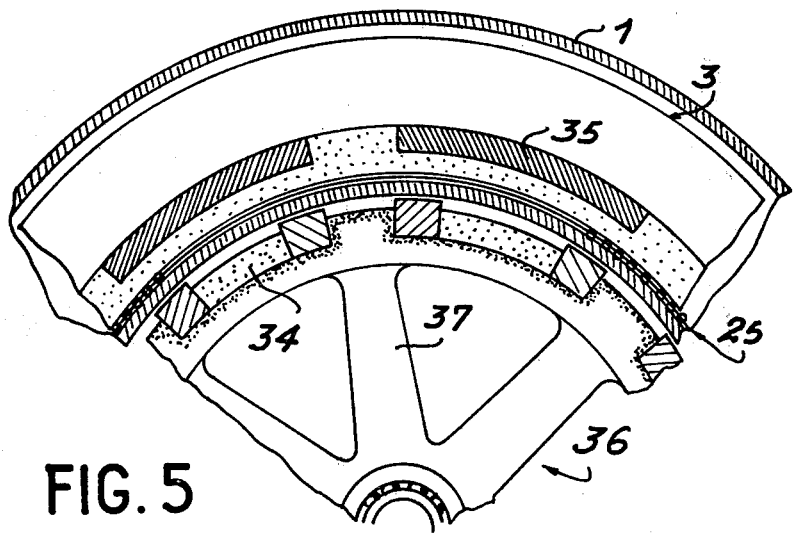
FIG. 5 another embodiment of the means for driving the paramagnetic substance support.

FIG. 5 diagrammatically shows a side view of a toroidal support 3 and its drive means 36 which, according to another embodiment shown in this drawing, are constituted by a wheel 37 peripherally provided with permanent magnets 34, positioned facing iron members 35 integral with support 3. FIG. 5 also shows the balls 25 facilitating the rotation of the support within cryostat 1. In this embodiment, the permanent drive magnets are magnetized by a very intense field higher than 10 Tesla and they are not disturbed by the fields applied to the cryostat, which are lower than 10 Tesla.

In the apparatus described hereinbefore, only the superconducting coils for applying the aforementioned magnetic fields to each of the parts of the cryostat have been described. These coils could possibly be replaced by permanent magnets. However, the choice of superconducting coils or permanent magnets depends on the intended applications of the apparatus. Thus, this apparatus makes it possible to reach the very low temperatures of the cold source, when the magnetic fields are produced by superconducting coils.

It is obvious that in the apparatus described hereinbefore, the various means could have been replaced by equivalent means without passing beyond the scope of the invention.

It is also obvious that the apparatus can constitute a refrigerator or a heat pump, because a heat quantity $Q_2$ is taken from the cold source and a heat quantity $Q_1$ is restored to the hot source.

What is claimed is:

1. A refrigerating or heat pumping process using a paramagnetic substance and a fluid in contact therewith, wherein it comprises performing:
   a magnetization of the substance by a magnetic field, said magnetisation being performed thermally at a fluid temperature close to a first temperature $T_1$ of a heat source;
   a cooling of the substance by heat exchange with the fluid between the first temperature $T_1$ and a second temperature of said fluid close to a second temperature $T_2$ of a cold source;
   a demagnetization of the substance by a magnetic field, said demagnetization being performed isothermally, at a temperature close to the second temperature $T_2$;
   a heating of the substance by heat exchange with the fluid between the second temperature $T_2$ and the first temperature $T_1$;
   the isothermal magnetization of the substance being performed by removing the magnetization heat by means of the fluid, by relative displacements of the fluid and the substance, the fluid firstly displacing in the displacement direction of the substance and then in the direction opposite thereto, in such a way that the temperatures at the start and finish of magnetization are the same.

2. Process according to claim 1, wherein the fluid is gaseous.

3. A process according to claim 2, wherein the gaseous fluid used is helium.

4. A process according to claim 1, wherein the paramagnetic substance used is a monocrystal of gadolinium garnet and gallium.

5. A refrigerating or heat pumping apparatus for performing the process according to claim 1, wherein it comprises:
   a toroidal cryostat, provided with at least first and second supply pipes and a third discharge pipe for the fluid, said third discharge pipe being positioned between the supply pipes, which are connected to a hot source at temperature $T_1$;
   a paramagnetic substance support having a toroidal shape and driven by means which rotate it within the cryostat in a predetermined direction;
   means for inducing a non-uniform magnetic field in the cryostat, in such a way that this magnetic field is low in the vicinity of the first fluid supply pipe, whose temperature is close to the temperature $T_1$ of the hot source, the fluid supplied by said first pipe being at pressure $P_1$ and circulating in the cryostat in the predetermined direction and in an opposite direction, on either side of the entry point of the first pipe into the cryostat, the magnetic field being at a maximum in the vicinity of the first fluid supply pipe, whose temperature is close to the temperature $T_1$ of the hot source, the fluid supplied by said second pipe being at pressure $P_1 - \_P_1$ below $P_1$. the fluid whose temperature is close to the temperature $T_1$ of the hot source being discharged by the third discharge pipe;
   fourth and fifth supply and discharge pipes for the said fluid located in the lower part, the temperature of the fluid supplied by this fourth pipe being close to the temperature $T_2$ of a cold source, below the temperature $T_1$ of the hot source, the field produced by the means for inducing a magnetic field being a demagnetization field of the substance between said fourth and fifth pipes.

6. An apparatus according to claim 5, wherein the means for inducing a magnetic field in the cryostat are constituted by superconducting coils disposed in such a way as to produce a radial field in the cryostat.

7. An apparatus according to claim 5, wherein the means for inducing a magnetic field in the cryostat are constituted by superconducting coils disposed so as to produce a transverse field in the cryostat.

8. An apparatus according to claim 5, wherein the means for inducing a magnetic field in the cryostat are constituted by permanent magnets disposed in such a way as to produce a radial field in the cryostat.

9. An apparatus according to claim 4, wherein the means for inducing a magnetic field in the cryostat are constituted by permanent magnets disposed in such a way as to produce a transverse field in the cryostat.

10. An apparatus according to claim 5, wherein the fluid is gaseous.

11. An apparatus according to claim 10, wherein the gaseous fluid is helium.

12. An apparatus according to claim 5, wherein the paramagnetic substance is a monocrystal of gadolinium garnet and gallium.

13. An apparatus according to claim 5, wherein the means for rotating the support are mechanical means.

14. An apparatus according to claim 5, wherein the means for rotating the support are magnetic means.

* * * * *